United States Patent
Bin Sediq et al.

(10) Patent No.: US 9,369,925 B2
(45) Date of Patent: Jun. 14, 2016

(54) SYSTEM AND METHODS TO ACHIEVE OPTIMUM EFFICIENCY-JAIN FAIRNESS IN WIRELESS SYSTEMS

(71) Applicant: FutureWei Technologies, Inc., Plano, TX (US)

(72) Inventors: Akram Bin Sediq, Ottawa (CA); Ramy Gohary, Ottawa (CA); Halim Yanikomeroglu, Ottawa (CA); Gamini Senarath, Ottawa (CA); Ho Ting Cheng, Stittsville (CA)

(73) Assignee: Futurewei Technologies, Inc., Plano, TX (US)

( * ) Notice: Subject to any disclaimer, the term of this patent is extended or adjusted under 35 U.S.C. 154(b) by 142 days.

(21) Appl. No.: 14/067,542

(22) Filed: Oct. 30, 2013

(65) Prior Publication Data

US 2014/0120974 A1    May 1, 2014

Related U.S. Application Data

(60) Provisional application No. 61/720,230, filed on Oct. 30, 2012.

(51) Int. Cl.
*H04W 52/00* (2009.01)
*H04W 28/24* (2009.01)
*H04W 52/14* (2009.01)

(52) U.S. Cl.
CPC ............ *H04W 28/24* (2013.01); *H04W 52/143* (2013.01)

(58) Field of Classification Search
USPC ........ 455/509, 450, 522, 452.1, 62, 512, 574, 455/453; 370/329, 392, 338, 252, 336, 254, 370/328, 208
See application file for complete search history.

(56) References Cited

U.S. PATENT DOCUMENTS

| | | | |
|---|---|---|---|
| 8,243,612 B2 | 8/2012 | Bahl et al. | |
| 8,289,875 B2 | 10/2012 | Wang et al. | |
| 2005/0002352 A1* | 1/2005 | Bao | H04L 1/1867 370/328 |
| 2006/0221920 A1* | 10/2006 | Gopalakrishnan | H04B 7/0617 370/338 |
| 2008/0219364 A1* | 9/2008 | Hui | H04L 5/0007 375/260 |
| 2008/0227395 A1* | 9/2008 | Kim | H04B 17/24 455/62 |
| 2009/0082028 A1* | 3/2009 | Hosein | H04W 72/04 455/450 |

(Continued)

OTHER PUBLICATIONS

International Search Report and Written Opinion received in International Application No. PCT/US2013/67589 mailed Jan. 22, 2014, 9 pages.

(Continued)

*Primary Examiner* — Ganiyu A Hanidu
(74) *Attorney, Agent, or Firm* — Slater Matsil, LLP (57) ABSTRACT

Embodiments are provided for scheduling resources considering data rate-efficiency and fairness trade-off. A value of Jain's fairness index (JFI) is determined for transmitting a service to a plurality of users, and accordingly a sum of throughputs is maximized for transmitting the service to the users. Alternatively, a sum of throughputs is determined first and accordingly the JFI is maximized. Maximizing the sum of throughputs or JFI includes selecting a suitable value for a tuning parameter in an efficiency and fairness trade-off relation model. In accordance with the values of sum of throughputs and JFI, a plurality of resources are allocated for transmitting the service to the users. For static or quasi-static channels, the relation model is a convex function with a monotonic trade-off property. For ergodic time varying channels, the tuning parameter is selected by solving the relation model using a gradient-based approach.

23 Claims, 5 Drawing Sheets

(56) References Cited

U.S. PATENT DOCUMENTS

| | | | | |
|---|---|---|---|---|
| 2009/0257392 | A1* | 10/2009 | Hosein | H04W 72/048 370/329 |
| 2013/0130707 | A1* | 5/2013 | Tarokh | H04W 72/121 455/452.1 |

OTHER PUBLICATIONS

3GPP TS 36.300 V11.2.0 (Jun. 2012), "Evolved Universal Terrestrial Radio Access (E-UTRA) and Evolved Universal Terrestrial Radio Access Network (E-UTRAN); Overall description;Stage 2 (Release 11)," tech. rep., Jun. 2012.

Biglieri et al., "Fading channels: Information-theoretic and communication aspects," IEEE Trans. Inf. Theory, vol. 44, No. 6, pp. 2619-2692, Oct. 1998.

Boyd et al., "Convex Optimization" 1st ed. Cambridge: Cambridge University Press, 2004. Cambridge Books Online. Web. Oct. 15, 2014, http://dx.doi.org/10.1017/CBO9780511804441.

Celtic/CP5-026 Project Winner+ Doc. 5D/478-E, "Software implementation of IMT.Eval channel model," tech. rep., Jun. 3, 2009.

Celtic/CP5-026 Project Winner+, "Calibration for IMT-Advanced Evaluations," tech. rep., May 21, 2010.

Ibing et al., "Fairness vs. efficiency: Comparison of game theoretic criteria for OFDMA scheduling.," in Proc. Asilomar Conf. Signals, Systems & Computers, pp. 275-279, Nov. 2007.

ITU, Report ITU-R M.2135-1, "Guidelines for evaluation of radio interface technologies for IMT-Advanced," tech. rep., Dec. 2009.

Kushner et al., "Convergence of proportional-fair sharing algorithms under general conditions," IEEE Trans. Wireless Commun., vol. 3, pp. 1250-1259, Jul. 2004.

Odlyzko, "Network neutrality, search neutrality, and the neverending conflict between efficiency and fairness in markets," Rev. Ntwk. Economics, vol. 8, issue 1, pp. 40-60, Mar. 2009.

Schoenen et al., "Fairness analysis in cellular networks using stochastic Petri nets," in Proc. IEEE Int. Symp. on Pers., Indoor and Mobile Radio Commun. (PIMRC), (Toronto, Canada), Sep. 2011.

Song et al., "Cross-layer optimization for OFDM wireless networks-part II: algorithm development," IEEE Trans. Wireless Commun., vol. 4, pp. 625-634, Mar. 2005.

Stolyar et al., "On the asymptotic optimality of the gradient scheduling algorithm for multiuser throughput allocation," Oper. Research, vol. 53, No. 1, pp. 12-25, Jan.-Feb. 2005.

Wong et al., "Multiuser OFDM with adaptive subcarrier, bit, and power allocation," IEEE J. Select. Areas Commun., vol. 17, No. 10 pp. 1747-1758, Oct. 1999.

Sediq, A., et al., A., "Optimal Tradeoff between Efficiency and Jain's Fairness Index in Resource Allocation," IEEE 23rd International Symposium on Personal Indoor and Mobile Radio Communications (PIMRC), Sep. 9-12, 2012, pp. 577-583.

Wong, C., et al., "Multi-Resource Allocation: Fairness-Efficiency Tradeoffs in a Unifying Framework," IEEE Proceedings INFOCOM, Mar. 25-30, 2012, pp. 1206-1214.

Mo, J., et al., "Fair End-to-End Window-Based Congestion Control," IEEE/ACM Transactions on Networking, vol. 8, No. 5, Oct. 2000, pp. 556-567.

Cheng, H., et al., "An Optimization Framework for Balancing Throughput and Fairness in Wireless Networks with QoS Support," IEEE Transactions on Wireless Communications, vol. 7, No. 2, Feb. 2008, pp. 584-593.

Kelly, F., et al., "Rate Control for Communication Networks: Shadow Prices, Proportional Fairness and Stability," Journal of the Operational Research Society, vol. 49, No. 3, Mar. 1998, pp. 237-252.

Wengerter, C., et al., "Fairness and Throughput Analysis for Generalized Proportional Fair Frequency Scheduling in OFDMA," IEEE 61st Vehicular Technology Conference, vol. 3, May 30-Jun. 1, 2005, pp. 1903-1907.

Jain, R., "A Quantitative Measure of Fairness and Discrimination for Resource Allocation in Shared Computer Systems," Technical Report TR-301, DEC Research Report, Sep. 26, 1984, pp. 1-38.

Lan, T., et al., "An Axiomatic Theory of Fairness in Network Resource Allocation," IEEE Proceedings INFOCOM, Mar. 14-19, 2010, pp. 1-9.

Zukerman, M., et al., "Efficiency-Fairness Tradeoff in Telecommunications Networks," IEEE Communications Letters, vol. 9, No. 7, Jul. 2005, pp. 643-645.

Sediq, A., et al., A., "Optimal Tradeoff between Sum-Rate Efficiency and Jain's Fairness Index in Resource Allocation," IEEE Transactions on Wireless Communications, vol. 12, No. 7, Jul. 2013, pp. 3496-3509.

Andrews, M., et al., "Optimal Utility Based Multi-User Throughput Allocation Subject to Throughput Constraints," 24th Annual Joint Conference of the IEEE Computer and Communications Societies, IEEE Proceedings INFOCOM, vol. 4, Mar. 13-17, 2005, pp. 2415-2424.

Bonald, T., et al., "Impact of Fairness on Internet Performance," Proceedings of the 2001 ACM SIGMETRICS International Conference on Measurement and Modeling of Computer Systems, Jun. 2001, pp. 82-91.

Schwarz, S., et al., "Throughput Maximizing Multiuser Scheduling with Adjustable Fairness," 2011 IEEE International Conference on Communications (ICC), Jun. 5-9, 2011, pp. 1-5.

Shen, Z., et al., "Adaptive Resource Allocation in Multiuser OFDM Systems With Proportional Rate Constraints," IEEE Transactions on Wireless Communications, vol. 4, No. 6, Nov. 2005, pp. 2726-2737.

* cited by examiner

SYSTEM AND METHODS TO ACHIEVE OPTIMUM EFFICIENCY-JAIN FAIRNESS IN WIRELESS SYSTEMS

This application claims the benefit of U.S. Provisional Application No. 61/720,230 filed on Oct. 30, 2012 by Akram Bin Sediq et al. and entitled "System and Method for Jain Scheduling in Wireless Networks," which is hereby incorporated herein by reference as if reproduced in its entirety.

TECHNICAL FIELD

The present invention relates to the field of wireless network communications, and, in particular embodiments, to a system and method for a mechanism to achieve optimum trade-off between efficiency and Jain fairness in wireless systems.

BACKGROUND

In systems, such as wireless communications systems, services are provided to users based on the allocation of shared finite resources that are limited. The allocation of these resources can encounter conflicting goals. For instance, favoring a certain class of users may increase the system's efficiency, but may result in the dissatisfaction of other classes of users. In contrast, providing equal services to all users may result in higher fairness but low efficiency. Using a trade-off policy to control the emphasis placed on various goals can result in wasteful allocation of resources, and less than optimal efficiency and fairness. For example, a benefit can be defined as the rates of data delivered to the users. The rates are controlled by appropriate allocation of radio resources at the transmitters. The transmitters may allocate their resources in such a way that maximizes the sum of the rates delivered to the users. This allocation favors users that are geographically closer to the transmitter at the expense of farther users. Although more efficient from the system's perspective, such allocation is unfair to users at less advantageous locations. A fairer allocation is one in which the minimum rate received by the users is maximized. However, this allocation can result in unacceptable system efficiency, e.g., a low sum rate. Hence, there is a need for a better mechanism to find an optimal trade-off policy that allocates resources with higher efficiency and at the same time higher fairness to the users.

SUMMARY OF THE INVENTION

In accordance with an embodiment, a method implemented by a network component for scheduling resources considering data rate-efficiency and fairness trade-off includes determining a value of Jain's fairness index (JFI) for transmitting a service to a plurality of users. The method further includes maximizing, for the determined value of JFI, a sum of throughputs for transmitting the service to the plurality of users. Maximizing the sum of throughputs for the determined value of JFI includes selecting a suitable value for a tuning parameter in an efficiency and fairness trade-off relation model for the JFI and the sum of throughputs. A plurality of resources are allocated for transmitting the service to the plurality of users in accordance with the maximized sum of throughputs for the determined value of JFI.

In accordance with another embodiment, a method implemented by a network component for scheduling resources considering data rate-efficiency and fairness trade-off includes determining a sum of throughputs for transmitting a service to a plurality of users, and maximizing, for the determined sum of throughputs, a value of JFI for transmitting the service to the plurality of users. Maximizing the value of JFI for the determined sum of throughputs includes selecting a suitable value for a tuning parameter in an efficiency and fairness trade-off relation model for the JFI and the sum of throughputs. A plurality of resources are allocated for transmitting the service to the plurality of users in accordance with the maximized value of JFI for the determined sum of throughputs.

In accordance with yet another embodiment, a network component for carrier aggregation for wireless networks includes at least one processor and a non-transitory computer readable storage medium storing programming for execution by the at least one processor. The programming includes instructions to schedule, for plurality of users, resources to transmit data of a service. The scheduled resources correspond to at least one of a target throughput of transmission and a target fairness level for the users. The programming includes further instructions to measure a JFI of the throughput, and in accordance with the measured JFI, adjust a tuning parameter in an efficiency and fairness trade-off relation model for the JFI and the throughput. The network component is further configured to reschedule the resources in accordance with the adjusted tuning parameter.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
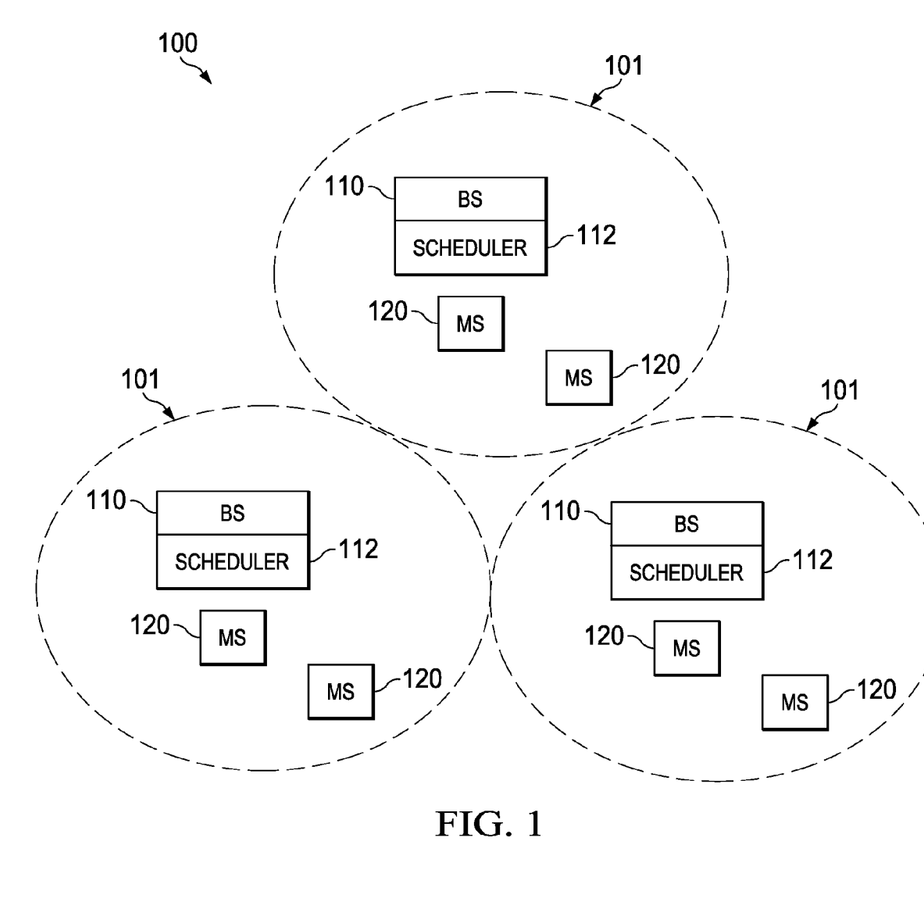
FIG. 1 illustrates an example of a wireless communications network.

FIG. 1 shows a wireless communications network 100 comprising a plurality of base stations (BSs) 110 and a plurality of mobile stations (MBs) 120. The BSs 110 provide voice and/or data wireless communication services to the MSs 120. The BSs 110, which may also be referred to by other names such as access networks (ANs), access point (APs), Node-Bs, or eNBs, send downlink (DL) information to the MSs 120 and receive uplink (UL) information from the MSs 120. The BSs 110 may have wireless coverage areas referred to as cells 101 within which the MSs 120 can be served. The coverage areas or cells 101 represent the range of each BS 110 to adequately transmit data, and, while not necessarily shown, the coverage areas 101 of adjacent BSs 110 may have some overlap in order to accommodate handoffs between BSs 110 whenever a MS 120 exits one coverage area 101 and enters an adjacent coverage area 101. Each BS 110 also includes a scheduler 112 for allocating radio resources to transmit data to the MSs 120.

However, the number of radio resources to be shared by users is finite. A scheduler generally determines how to allocate the resources to the users in an efficient and fair manner. Efficiency of the allocation is traditionally represented by the sum rate, whereas fairness is separately represented by various measures, including an α-fairness measure. It is shown by T. Lan et al. in Proceedings of IEEE International Conference on Computer Communications (INFOCOM), March 2010, which is incorporated herein by reference, that an α-fair trade-off policy provides optimum trade-off between efficiency and a variable fairness measure that depends on the extrinsic parameter α. Because maximizing the α-fair utility corresponds to optimizing a variable fairness measure, it can be shown that this utility does not guarantee optimum trade-off between efficiency and any fixed (α-independent) fairness measure. The Jain's index is another definition used to quantify fairness. This index is a bounded continuous function of the service and a metric that conforms with standard fairness benchmarks. Compared with other measures, such as the α-fairness measure, the Jain's index provides fairness criterion that takes into consideration all the users of the system, not only those users that are assigned minimal resources. Hence, maximizing this index while avoiding wasteful allocation of resources requires the determination of the optimal trade-off between efficiency and this index. However, the α-fair allocations are not guaranteed to achieve the optimal trade-off between efficiency and Jain's index except for the case of considering only two users.

Embodiments are provided herein to obtain the optimal efficiency-fairness trade-off for any number of users using the Jain's index measure of fairness. This approach allows the implementation of a relatively simple scheduler that yields long-term average rates, which achieves an optimal efficiency-Jain fairness trade-off. Details of the problem, including formulation, solution, and comparison to α-fair allocations in terms of optimal efficiency-fairness trade-off, are described by Akram Bin Sediq et al. in "Optimal Tradeoff between Efficiency and Jain's Fairness Index in Resource Allocation," IEEE International Symposium on Personal, Indoor, and Mobile Radio Communications (PIMRC), Sep. 9, 2012, and further in "Optimal tradeoff between sum-rate efficiency and Jain's fairness index in resource allocation," IEEE transactions on Wireless Communications, July 2013, both which are hereby incorporated herein by reference as if reproduced in their entirety. To solve the set of optimization problems, sufficient conditions are also derived. The conditions enable identifying sets of admissible services for which these problems are relatively simple to solve.

The embodiments include an optimal efficiency-Jain scheduler for quasi-static channels with time sharing. In this case, time-sharing generally is possible. The scheduler is obtained by solving a standard convex optimization problem. As an example, a channel between a BS and fixed relays can be modeled as a quasi-static channel. With respect to optimal efficiency-Jain scheduling for quasi-static channels with time sharing, a plurality of parameters are defined. The parameters include the data rate $r_{mn}$ of user m on resource block (RB) n. The RB represents the frequency channel for transmitting the data. The parameters include a scheduling variable $\rho_{mn} \in [0,1]$ that assigns the RB n to user m for a fraction $\rho_{mn}$ of the signaling interval. The total data rate of user m is defined as $x_m = \sum_{n=1}^{N} \rho_{mn} r_{mn}$, where N is the maximum number of RBs considered. Further, x is a length-M vector (M is an integer) of non-negative real entries $\{x_i\}_{i=1}^{M}$ representing the rates of users. For $x \in \mathbb{R}_+^M$, the Jain's fairness index $\mathcal{J}: \mathbb{R}_+^M \to \mathbb{R}_+$ is defined as $$\mathcal{J}(x) = \frac{\left(\sum_{i=1}^{M} x_i\right)^2}{M \sum_{i=1}^{M} x_i^2},$$

where $$\mathcal{J} = \frac{1}{M}$$

corresponds to the least fair allocation in which only one user receives a non-zero service, and $\mathcal{J}=1$ corresponds to the fairest allocation in which all users receive the same benefit. The parameters further include a threshold $x_{min} \geq 0$ on the minimum rate that can be delivered to each user. Thus, a set of all feasible rates $\mathcal{C} \subseteq \mathbb{R}_+^M$ is the given by $\mathcal{C} = \{x | x_m = \sum_{n=1}^{N} \rho_{mn} r_{mn}, \sum_{m=1}^{M} \rho_{mn} \leq 1, \rho_{mn} \in [0,1], x_m \geq x_{min}\}$.

The problem, as formulated above, generally may be difficult to solve. In an embodiment, a key property, namely a monotonic trade-off property, is identified to simplify the solution. When possessed by $\mathcal{C}$, this property enables transforming the original problem formulation above to an equivalent convex form. For an algorithm with a rate vector x and a function of scheduling variable $\rho_{mn}$, the trade-off is parameterized by a total sum-rate σ. For each given σ, the scheduling variables can be found by solving the equation $\rho_{mn} = \arg\min_{\sum_{m=1}^{M} x_m = \sigma, x \in \mathcal{C}} \|x\|^2$. Conditions for the monotonic trade-off property for $\mathcal{C}$, which simplifies the solution, are satisfied in various resource allocation problems in communication networks. For instance, in congestion control in elastic traffic communication networks, the users share finite capacity links and the goal is to assign the service vector x, which represents the rates delivered to the users, in an efficient and fair manner.

In another embodiment, an optimal efficiency-Jain scheduler is provided for ergodic time-varying channels with long-term average rates. In this case, time sharing generally is not possible. The scheduler is obtained by solving a stochastic optimization problem using a gradient-based approach. A plurality of parameters are defined, including the data rate $r_{mn}(t)$ of user m on RB n at time t. The parameters include a binary scheduling variable $\rho_{mn}(t) \in \{0,1\}$ that assigns the RB n to user m at time t. Due to time-variation, an appropriate performance measure is the long-term average rate, rather than instantaneous rates. A small positive scalar $\mu \in (0,1)$ is introduced. Hence, the exponentially weighted moving average rate for user m in time t is given by $W_m(t)=(1-\mu)W_m(t-1)+\mu\Sigma_{n=1}^{N}\rho_{mn}(t)r_{mn}(t)$.

This may be a difficult optimization problem to solve due to stochastic variations. However, the set of all achievable long-term average rates satisfies the monotonic trade-off property. The solution can be obtained by applying the gradient-based scheduling algorithm to an auxiliary optimization problem that is derived from the original problem, which corresponds to maximizing Jain's fairness index for a given efficiency. The equivalence of the considered optimization problem and the long-term optimality of the obtained algorithm are proved using the monotonic trade-off property. The proof of the monotonic trade-off property is described by Akram Bin Sediq et al., PIMRC 2012.

The trade-off is parameterized by $\beta \in [\beta^*, \infty)$, where $\beta^*$ is the largest $\beta$ such that Jain's index is 1 (Jain's index is maximal). The value of $\beta^*$ depends on the feasible set of the average rates and can be obtained either online using standard adaptive techniques, or offline if the statistics of the instantaneous rates are available, as described above. The role of $\beta$ is to control the total sum-rate indirectly. An optimal long-term average efficiency-Jain scheduler can be expressed as:

$$\rho_{mn} = \begin{cases} 1, & \text{if } m = \text{argmax}_{n \in M}(\beta - W_m(t-1))r_{mn}(t), \\ 0, & \text{otherwise} \end{cases}.$$

Figure 2:
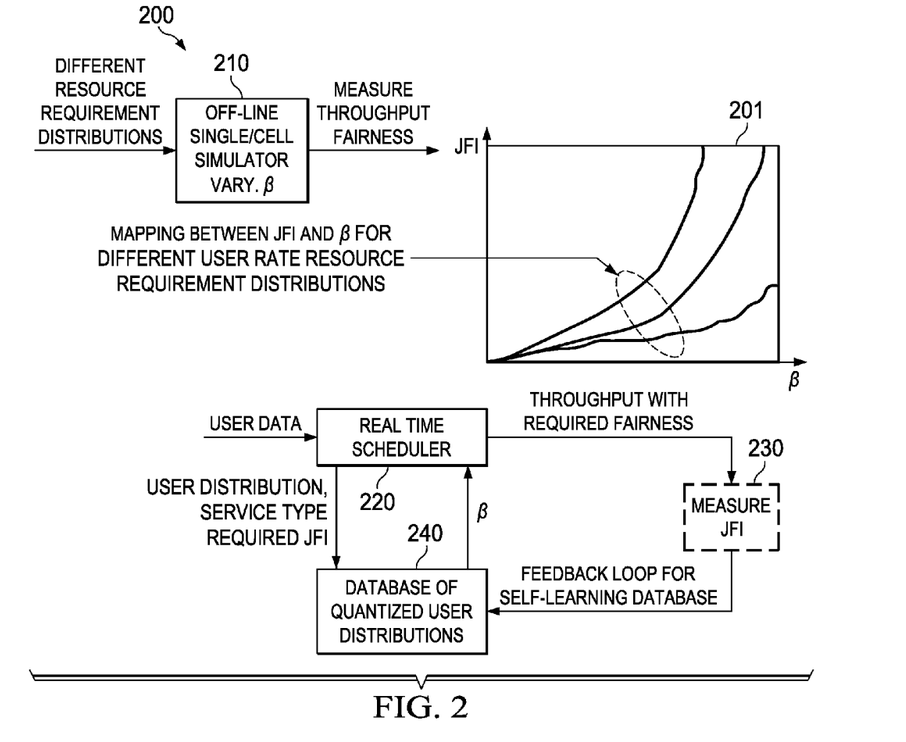
FIG. 2 illustrates an embodiment of a scheduler system using data from an off-line simulator.

FIG. 2 illustrates an embodiment of a real-time scheduler system 200 using data from an off-line simulator. The real-time scheduler system 200 provides a certain level of fairness using off-line simulations with different user rate distributions and different $\beta$ values. A database 240 of required $\beta$ values to achieve corresponding levels of Jain's fairness index (JFI) is prepared off-line for different rate distributions. An off-line single cell simulator 210 calculates throughput for different resource requirement distributions, such as different data rates that can be supported, mean signal-to-interference-plus-noise ratio (SNIR), and/or rates supported weighted by the traffic, for varying $\beta$ values. The JFI is then measured for the throughput values. Thus, a mapping 201 between JFI and $\beta$ values is obtained for different user rate resource requirement distributions. Subsequently, in real-time, a scheduler 220 receives user data and schedule resources for users with required fairness. The required fairness value is predefined. The JFI for the data throughput is then measured by a JFI measurement module or block 230, and the value is matched with the database 240 of quantized user distributions to obtain an adjusted $\beta$ value corresponding to the JFI (according to the mapping 201). The adjusted $\beta$ value from the database 220 is then used by the real-time scheduler 220 to schedule resources with corresponding throughput. The scheduler system 200 is implemented in real-time after preparing the database 240 off-line.

Figure 3:
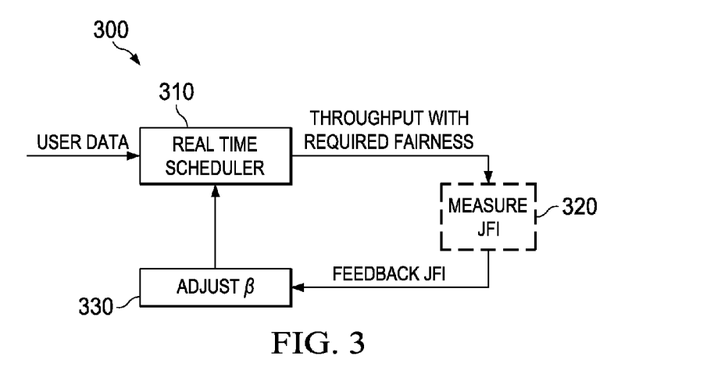
FIG. 3 illustrates an embodiment of a scheduler system using a Jain's fairness index (JFI) feedback loop.

FIG. 3 illustrates an embodiment of a real-time scheduler system 300 using a JFI feedback loop. The JFI feedback loop is used to adjust the $\beta$ value in real-time and hence update scheduling and throughput. In real-time, a scheduler 310 receives user data and schedule resources for users with a certain required fairness. The required fairness value is predefined. The JFI for the data throughput is then measured by a JFI measurement module or block 320, and the value is sent to a module 330 for adjusting the $\beta$ value in real-time according to the measured JFI and a target JFI. The $\beta$ value calculation at the module 330 is based on the solutions described above. The calculated $\beta$ value is then used by the real-time scheduler 310 to reschedule resources and hence adjust throughput to reach the target JFI. The scheduler system 300 can be implemented entirely in real-time without using a previously prepared database.

The schedulers above may be implemented in wireless networks, e.g., in BSs or network controllers, to guarantee achieving an optimal trade-off between sum-rate and Jain's index for fairness, unlike other types of schedulers that may not provide, strictly or for all users of a service, a higher sum-rate and at the same time a higher Jain's index. The service provider can adjust the trade-off between sum-rate and Jain's fairness index in a relatively simple manner and achieve both optimal efficiency and fairness. The schedulers may achieve a specified level of fairness (measured by Jain's index) that conforms to standard fairness benchmarks. Thus, virtual network services specifying a certain level of fairness can be provided to users. The fairness measure, which is used to adjust resource allocation, is bounded between 0 and 1. Generally, maximizing the Jain's index metric increases the number of satisfied users and guarantees a specific level of fairness across the users. For example, users can be located in locations that support different rates with the same amount of resources. As described above, a scheduler can achieve all the points in the optimal efficiency-Jain trade-off curve via a single tuning parameter ($\beta$). This scheduler implementation is simpler than, for example, the $\alpha$-fair scheduler in practice.

Figure 4A:
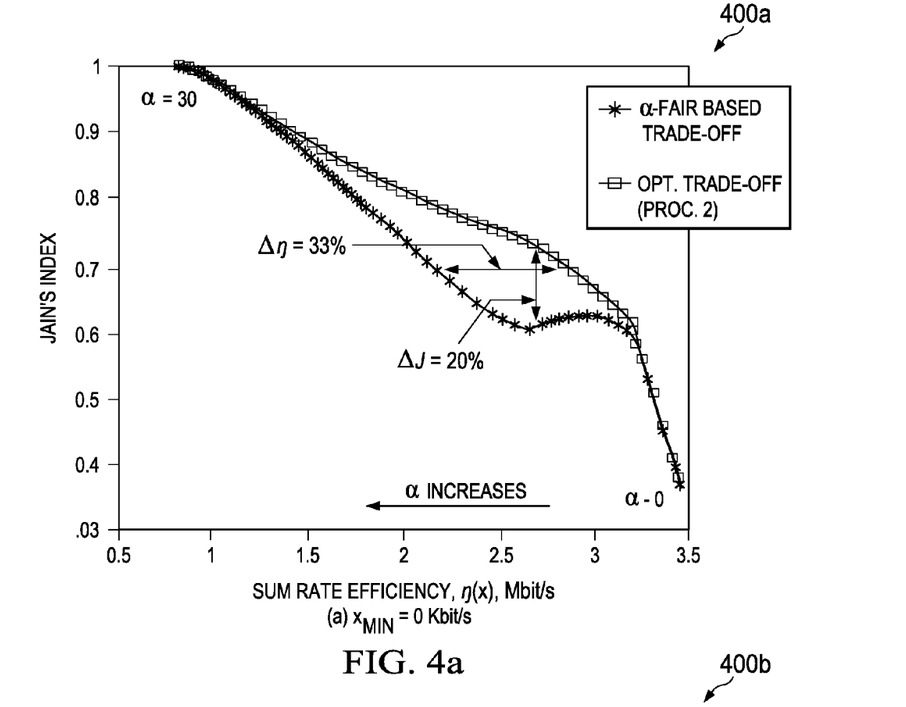
FIGS. 4a and 4b illustrate graphs of system performance for a first simulation scenario.
Figure 4B:
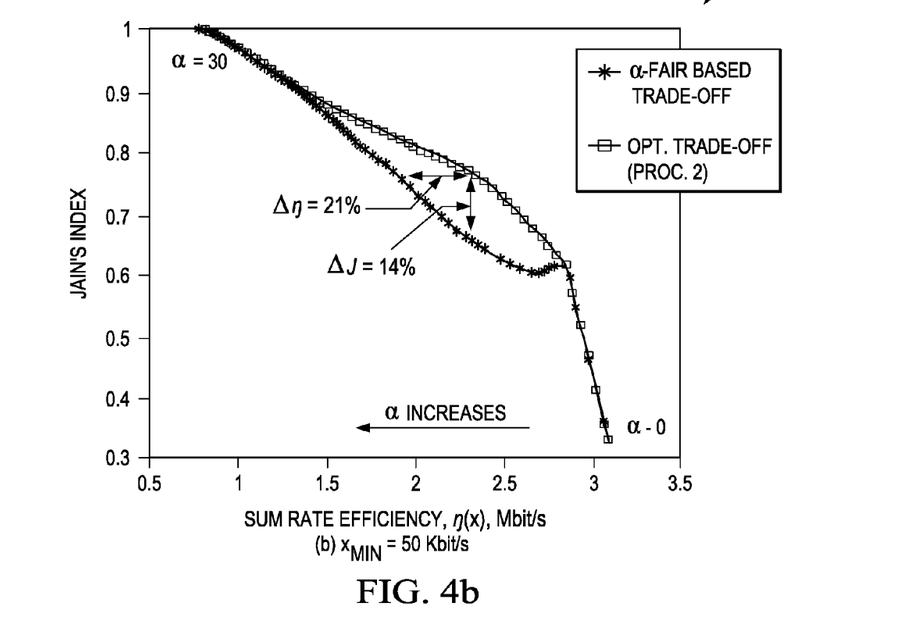
Figure 5A:
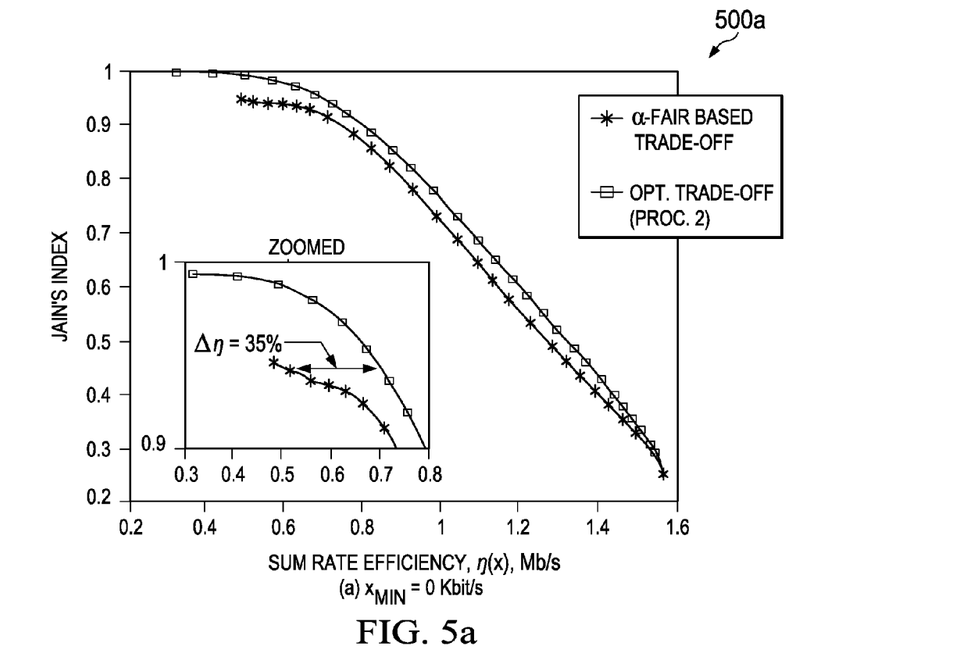
FIGS. 5a and 5b illustrate graphs of system performance for a second simulation scenario.
Figure 5B:
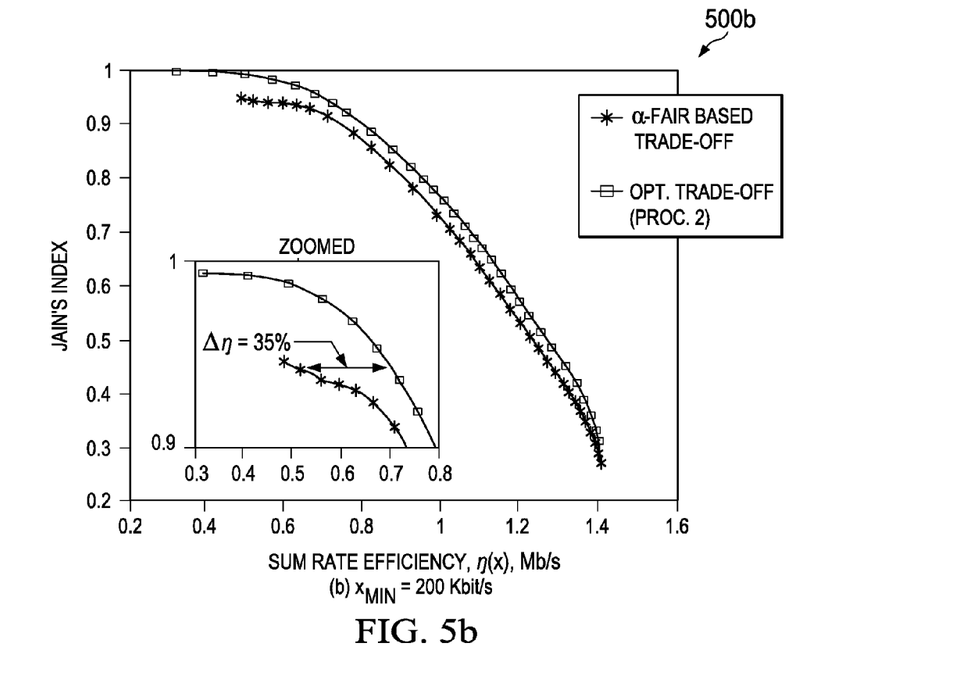

Simulation results show that the scheduler design herein provides better performance, with lower complexity, compared to the widely used $\alpha$-fair scheduler. FIGS. 4a and 4b show exemplary graphs of system performance for a first simulation scenario. Specifically, M=4 users and N=5 RBs are considered for quasi-static channels. The results for these parameters are shown for $x_{min}$=0 Kbit/s in FIG. 4a, and $x_{min}$=50 Kbit/s in FIG. 4b. In both cases, results show that higher fairness (according to Jain's index value) is achieved for the same sum rate efficiency (in the range from 1.5 to 3 Mbit/s) using the scheduling schemes described herein in comparison to the $\alpha$-fair scheduler. FIGS. 5a and 5b show exemplary graphs of system performance for a second simulation scenario for urban macro (UMa) environment with a time-varying channel. The results for M=4 users and N=5 RBs are shown for $x_{min}$=0 Kbit/s in FIG. 5a, and for $x_{min}$=200 Kbit/s in FIG. 5b. In both cases, results also show that higher fairness (according to Jain's index value) is achieved for the same sum rate efficiency (in the range from 0.5 to 1.4 Mbit/s) using the scheduling schemes herein in comparison to the $\alpha$-fair scheduler.

Figure 6:
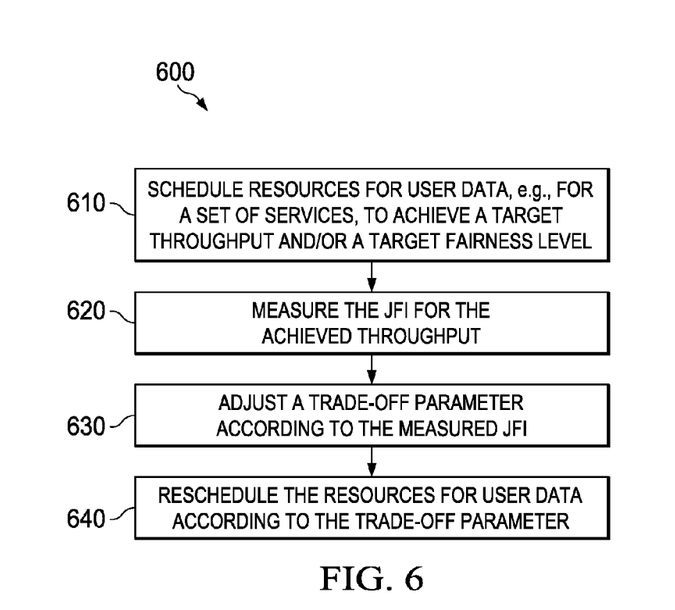
FIG. 6 illustrates an embodiment of a scheduler method for achieving optimum efficiencies and fairness.

FIG. 6 is a flowchart for an embodiment of a method 600 using the optimal efficiency-Jain index scheduling. At step 610, the scheduler (e.g., at a BS or a network controller) schedules resources for user data, e.g., for a set of services, to achieve a target throughput and/or a target fairness level. At step 620, the JFI is measured for the achieved throughput. At step 630, a trade-off parameter is adjusted according to the measured JFI. The trade-off parameter may be $\sigma$ in the case of quasi-static channels with time sharing, or $\beta$ in the case of varying channels with long-term average rates. At step 640, the scheduler reschedules the resources for user data according to the trade-off parameter.

Figure 7:
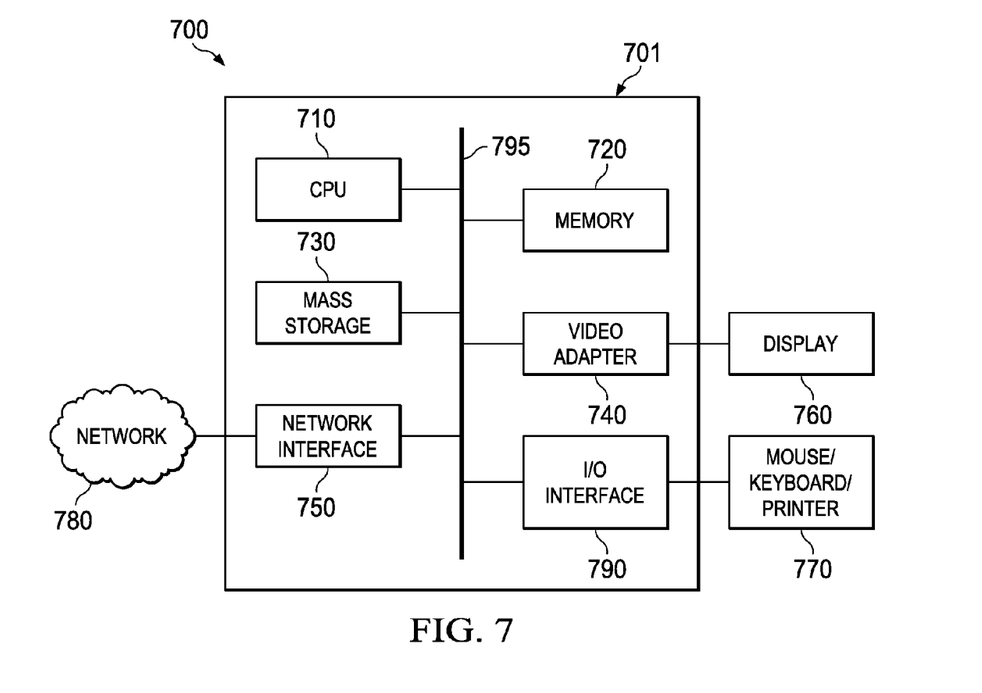
FIG. 7 is a diagram of a processing system that can be used to implement various embodiments.

FIG. 7 is a block diagram of an exemplary processing system 700 that can be used to implement various embodiments. Specific devices may utilize all of the components shown, or only a subset of the components and levels of integration may vary from device to device. For example, the devices include the APs and the STAs of a WLAN or a Wi-Fi system. Furthermore, a device may contain multiple instances of a component, such as multiple processing units, processors, memories, transmitters, receivers, etc. The processing system 700 may comprise a processing unit 701 equipped with one or more input devices, such as a microphone, mouse, touchscreen, keypad, keyboard, and the like. Also, processing system 700 may be equipped with one or more output devices, such as a speaker, a printer, a display, and the like. The processing unit may include central processing unit (CPU) 710, memory 720, mass storage device 730, video adapter 740, and I/O interface 790 connected to a bus 795.

The bus 795 may be one or more of any type of several bus architectures including a memory bus or memory controller, a peripheral bus, video bus, or the like. The CPU 710 may comprise any type of electronic data processor. The memory 720 may comprise any type of system memory such as static random access memory (SRAM), dynamic random access memory (DRAM), synchronous DRAM (SDRAM), read-only memory (ROM), a combination thereof, or the like. In an embodiment, the memory 720 may include ROM for use at boot-up, and DRAM for program and data storage for use while executing programs. The mass storage device 730 may comprise any type of storage device configured to store data, programs, and other information and to make the data, programs, and other information accessible via the bus 795. The mass storage device 730 may comprise, for example, one or more of a solid state drive, hard disk drive, a magnetic disk drive, an optical disk drive, or the like.

The video adaptor 740 and I/O interface 790 provide interfaces to couple external input and output devices to the processing unit. As illustrated, examples of input and output devices include the display 760 coupled to the video adapter 740 and the mouse/keyboard/printer 770 coupled to the I/O interface 790. Other devices may be coupled to the processing unit 701, and additional or fewer interface cards may be utilized. For example, a serial interface card (not shown) may be used to provide a serial interface for a printer.

The processing unit 701 also includes one or more network interfaces 750, which may comprise wired links, such as an Ethernet cable or the like, and/or wireless links to access nodes or different networks. The network interface 750 allows the processing unit 701 to communicate with remote units via one or more networks 780. For example, the network interface 750 may provide wireless communication via one or more transmitters/transmit antennas and one or more receivers/receive antennas. In an embodiment, the processing unit 701 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method by a network component for scheduling resources considering data rate-efficiency and fairness trade-off, the method comprising:
   determining a value of Jain's fairness index (JFI) for transmitting a service to a plurality of users;
   maximizing a sum of throughputs for transmitting the service to the plurality of users using the determined value of JFI as a feedback control parameter, wherein maximizing the sum of throughputs using the determined value of JFI as a feedback control parameter includes selecting a value for a tuning parameter in an efficiency and fairness trade-off relation model for the JFI and the sum of throughputs; and
   allocating resources for transmitting the service to the plurality of users in accordance with the maximized sum of throughputs for the determined value of JFI, wherein, for the same JFI, the sum of throughputs exceeds a sum of throughputs obtained by maximizing an α-fairness utility.

2. The method of claim 1, wherein maximizing the sum of throughputs using the determined value of JFI as a feedback control parameter comprises:
   transmitting the service to the plurality of users in accordance with the allocated resources;
   measuring a Jain's fairness index (JFI) of throughputs;
   in accordance with the measured JFI, adjusting the tuning parameter in accordance with the efficiency and fairness trade-off relation model between the JFI and the sum of throughputs; and
   reallocating the resources in accordance with the adjusted tuning parameter.

3. The method of claim 2, wherein adjusting the tuning parameter includes solving, in real-time during transmission of the data, the efficiency and fairness trade-off relation model using a gradient-based approach.

4. The method of claim 1 further comprising:
   calculating JFI values for a plurality of data rates and varying values of the tuning parameter;
   mapping the JFI values to the varying values of the tuning parameter for each one of the data rates; and
   preparing a database of the mapping, the database relating the JFI values to the varying values of the tuning parameter for each one of the data rates.

5. The method of claim 4, wherein maximizing the sum of throughputs using the determined value of JFI as a feedback control parameter comprises:
   transmitting the service to the plurality of users in accordance with the allocated resources;
   measuring a Jain's fairness index (JFI) of the throughputs;
   in accordance with the measured JFI, adjusting the tuning parameter by mapping the measured JFI to a corresponding tuning parameter value in the database; and
   reallocating the resources in accordance with the adjusted tuning parameter.

6. The method of claim 5, wherein the tuning parameter is adjusted to achieve a required fairness level for a given set of data rates for the users.

7. The method of claim 4, wherein the database is prepared off-line before transmitting the service to the plurality of users in accordance with the allocated resources.

8. The method of claim 1, wherein the users are located in locations supporting different data rates using same amount of resources.

9. The method of claim 1, wherein the resources are allocated for transmitting the service to the plurality of users on static or quasi-static channels with time sharing, and wherein the efficiency and fairness trade-off relation model is a convex function having a monotonic trade-off property.

10. The method of claim 1, wherein resources are allocated for transmitting the service to the plurality of users on ergodic time varying channels, and wherein selecting the value for the tuning parameter includes solving the efficiency and fairness trade-off relation model using a gradient-based approach.

11. The method of claim 1, wherein the sum of throughputs is a sum of long-term average data rates corresponding to the plurality of users.

12. The method of claim 1, wherein, according to the efficiency and fairness trade-off relation model, a user is assigned a resource block (RB) from the resource blocks if the user has a maximum value of a product of a data rate at the RB and a difference between the tuning parameter and an exponentially weighted moving average for the user at the RB.

13. The method of claim 1, wherein the network component is a scheduler at a wireless transmitting or receiving station.

14. A method by a network component for scheduling resources considering data rate-efficiency and fairness trade-off, the method comprising:
determining a sum of throughputs for transmitting a service to a plurality of users;
maximizing, for the determined sum of throughputs, a value of Jain's fairness index (JFI) for transmitting the service to the plurality of users, wherein maximizing the value of JFI for the determined sum of throughputs includes selecting a value for a tuning parameter in an efficiency and fairness trade-off relation model for the JFI and the sum of throughputs, and wherein, for the same sum of throughputs, the maximized value of JFI exceeds a JFI value obtained by maximizing an α-fairness utility; and
allocating resources for transmitting the service to the plurality of users in accordance with the maximized value of JFI for the determined sum of throughputs.

15. The method of claim 14 further comprising:
transmitting the service to the plurality of users in accordance with the allocated resources;
measuring a Jain's fairness index (JFI) of the throughputs;
in accordance with the measured JFI, adjusting the tuning parameter in accordance with the efficiency and fairness trade-off relation model between the JFI and the sum of throughputs; and
reallocating the resources in accordance with the adjusted tuning parameter.

16. The method of claim 15, wherein adjusting the tuning parameter includes solving, in real-time during transmission of the data, the efficiency and fairness trade-off relation model using a gradient-based approach.

17. The method of claim 15 further comprising:
calculating JFI values for a plurality of data rates and varying values of the tuning parameter;
mapping the JFI values to the varying values of the tuning parameter for each one of the data rates; and
preparing a database of the mapping, the database relating the JFI values to the varying values of the tuning parameter for each one of the data rates.

18. The method of claim 17 further comprising:
transmitting the service to the plurality of users in accordance with the allocated resources;
measuring a Jain's fairness index (JFI) of the throughputs;
in accordance with the measured JFI, adjusting the tuning parameter by mapping the measured JFI to a corresponding tuning parameter value in the database; and
reallocating the resources in accordance with the adjusted tuning parameter.

19. The method of claim 18, wherein the tuning parameter is adjusted to achieve a required fairness level for a given set of data rates for the users.

20. The method of claim 17, wherein the database is prepared off-line before transmitting the service to the plurality of users in accordance with the allocated resources.

21. A network component for wireless networks, the network component comprising:
at least one processor; and
a non-transitory computer readable storage medium storing programming for execution by the at least one processor, the processor being configured to execute the programming to:
determine a value of Jain's fairness index (JFI) for transmitting a service to a plurality of users;
maximize a sum of throughputs for transmitting the service to the plurality of users using the determined value of JFI as a feedback control parameter, wherein maximizing the sum of throughputs using the determined value of JFI as a feedback control parameter includes selecting a value for a tuning parameter in an efficiency and fairness trade-off relation model for the JFI and the sum of throughputs; and
allocate resources for transmitting the service to the plurality of users in accordance with the maximized sum of throughputs for the determined value of JFI, wherein, for the same JFI, the sum of throughputs exceeds a sum of throughputs obtained by maximizing an α-fairness utility.

22. The network component of claim 21, wherein the plurality of users exceed two users, and wherein the users are located in locations supporting different data rates using the same amount of resources.

23. The network component of claim 21, wherein the network component is a scheduler at a base station (BS) or a network controller of a wireless network.

* * * * *